US008874776B2

(12) United States Patent
Serban et al.

(10) Patent No.: US 8,874,776 B2
(45) Date of Patent: Oct. 28, 2014

(54) VIRTUAL AD HOC NETWORK TESTBEDS FOR NETWORK-AWARE APPLICATIONS

(75) Inventors: Constantin Serban, Metuchen, NJ (US); Alexander Poylisher, Brooklyn, NY (US); Cho-Yu Jason Chiang, Clinton, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 697 days.

(21) Appl. No.: 13/042,834

(22) Filed: Mar. 8, 2011

(65) Prior Publication Data

US 2012/0059921 A1    Mar. 8, 2012

Related U.S. Application Data

(60) Provisional application No. 61/311,607, filed on Mar. 8, 2010.

(51) Int. Cl.
*G06F 15/16* (2006.01)
*G06F 15/173* (2006.01)
*G06F 11/36* (2006.01)

(52) U.S. Cl.
CPC .................................. *G06F 11/3664* (2013.01)
USPC .............................. 709/231; 709/224; 709/201

(58) Field of Classification Search
CPC ............ G06F 11/3612; G06F 9/45537; G06F 11/3664; G06F 17/5009; H04L 41/145
USPC ...................................................... 709/224, 231
See application file for complete search history.

(56) References Cited

U.S. PATENT DOCUMENTS

| | | | |
|---|---|---|---|
| 2005/0141706 A1* | 6/2005 | Regli et al. ...................... | 380/44 |
| 2008/0123586 A1* | 5/2008 | Manser .......................... | 370/328 |
| 2008/0209425 A1* | 8/2008 | Ferris ............................ | 718/102 |
| 2009/0320011 A1* | 12/2009 | Chow et al. ................... | 717/154 |
| 2010/0284337 A1* | 11/2010 | Luft et al. ..................... | 370/328 |

* cited by examiner

*Primary Examiner* — Karen Tang

(57) ABSTRACT

A virtual ad hoc network testbed provides the capability to instrument a testbed in order to support the execution of network-aware applications "as is." Network aware applications are a special class of applications that interact with a network not only by using the network for communication purposes, but also configure or read the status of network devices. Local stack management provides the means to automatically construct standard APIs for accessing the information residing in a simulated or emulated network, and instantiate these APIs. The testbed is designed to bridge a standard management module (such as SNMP) and a simulation or emulation model, starting from a MIB module. The testbed uses CORBA as a communication means. The process is divided into two parts, agent side and model side.

6 Claims, 4 Drawing Sheets

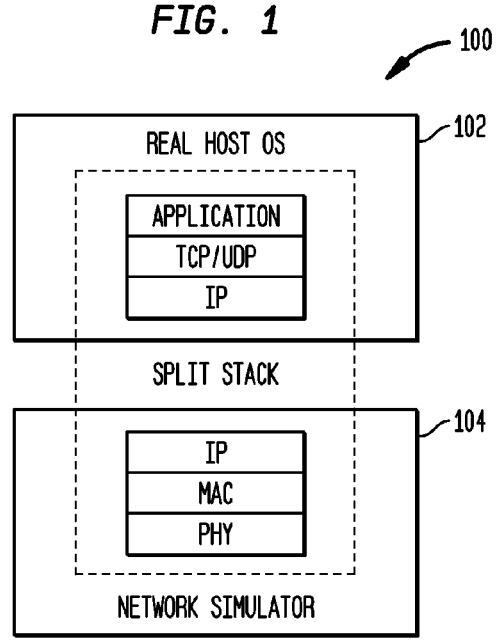
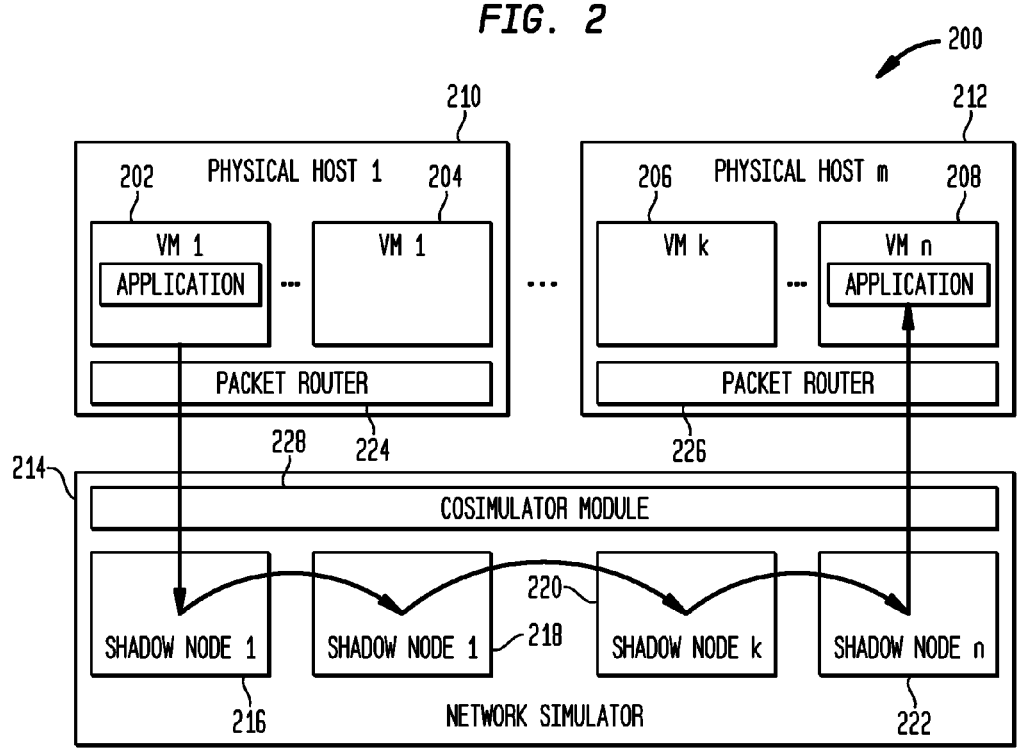

VIRTUAL AD HOC NETWORK TESTBEDS FOR NETWORK-AWARE APPLICATIONS

CROSS-REFERENCE TO RELATED APPLICATIONS

This application claims the benefit of U.S. Provisional Application No. 61/311,607, filed on Mar. 8, 2010 which is incorporated by reference herein in its entirety.

FIELD OF THE INVENTION

The present invention relates generally to virtual ad hoc network testbeds for network-aware applications. Specifically, the invention concerns testbed technologies supporting the testing of network-aware applications over virtual MANETs.

BACKGROUND OF THE INVENTION

Testing and evaluation of functional correctness and communications performance of distributed applications over Mobile Ad hoc NETworks (MANETs) pose significant challenges in both feasibility and scalability. With respect to feasibility, ad hoc network hardware is often experimental and available only in small quantities, so conducting evaluation of more than a few hardware devices is either infeasible or impractical for cost reasons. With respect to scalability, running large-scale evaluations of MANETs in a physical terrain is very costly in terms of logistics, so the number of tests that can be performed would typically be much less than adequate.

In order to address the aforementioned challenges, virtual MANETs based on simulated or emulated networks are used for application testing and evaluation. Applications send packets over virtual MANETs where their network characteristics including packet delivery latency, effective link bandwidth, packet delivery jitter, etc., are similar to those of real MANETs. In most cases, a virtual network built using precise simulation models can provide the desired level of approximation to address fidelity concerns.

Network aware applications are a special class of applications that interact with a network not only by using the network for communication purposes, but also configure or read the status of network devices. The present invention provides the ability to automatically construct standard APIs for accessing the information residing in a simulated or emulated network, and instantiate these APIs.

Most prior work in network testbeds does not deal with network-aware applications. Most network simulators offer basic mechanisms for exchanging information between the simulation model and outside world. Such mechanisms do not offer standardized APIs network aware applications use to interact with networks. SNT's EXata, described in Scalable Network Technologies, "EXata," 2009. [Online], available at http://www.scalable-networks.com/products/exata.php, offers small subset of standardized APIs for accessing some parameters, but offers no automatic tools for deriving such APIs to match specific applications. Their solution is not scalable and offers a limited means for accessing driver's parameters through piggybacking information on packets. The method is incomplete, not general, and does not offer automation.

Prior work applicable to functional testing and performance evaluation of distributed software systems can be roughly divided into the following categories by the characteristics of the approaches:

Specialized network testbeds: This type of approaches addresses testing a network consisting of some specific hardware and/or software components (e.g., radios and/or OSs). Some approaches allow the use of real distributed systems for testing (e.g., D. Johnson, T. Stack, R. Fish, D. M. Flickingery, L. Stoller, R. Ricci, and J. Lepreau, "Mobile Emulab: A Robotic Wireless and Sensor Network Testbed." in *Proc. of IEEE INFOCOM '06*, Barcelona, Spain, 2006, while others only allow models for a specific network simulator to be used as test targets e.g., P. De, A. Raniwala, S. Sharma, and T.-C. Chiueh, "MiNT: A Miniatur-ized Network Testbed for Mobile Wireless Research," in *Proc. of IEEE INFOCOM '05*, Miami, Fla., 2005). The VAN testbed approach of the present invention aims to be as generic as possible with respect to simulators, models, and OSs/applications.

Full network emulation: An emulated network, from the viewpoint of packet forwarding, introduces various conditions, e.g., packet loss, delay, jitter. When a network is "emulated", both the packet forwarding process and network protocol interactions are neither real nor being modeled as stepwise transitions using finite state machines reflecting actual protocols. Often, protocol stack interactions are modeled by programs offering simple, abstracted behaviors, e.g., a packet entering the emulated network is either regarded as dropped along the route, or delivered to its destination node after certain delay, with or without error. To use emulated network for testing and evaluation of real distributed software, packets generated by real software must be "injected" into the emulated network as if routed into a real network. M. Carson and D. Santay, "NIST Net: a linux-based network emulation tool," *ACM SIGCOMM Computer Communication Review*, vol. 33:3, pp. 111-126, 2003, A. Vandat, K. Yocum, K. Walsh, P. Mahadevan, D. Kostic, J. Chase, and D. Becker, "Scalability and accuracy in a large-scale network emulator," in *Proc. of USENIX OSDI '02*, Boston, Mass., 2002, B. White, J. Lepreau, L. Stoller, R. Ricci, S. Guruprasad, M. Newbold, M. Hibler, C. Barb, and A. Joglekar, "An integrated experimental environment for distributed systems and networks," in *Proc. of USENIX OSDI '02*, Boston, Mass., 2002, Y. Zhang and W. Li, "An integrated environment for testing mobile ad-hoc networks," in *Proc. of ACM MOBIHOC '02*, Lausanne, Switzerland, 2002, P. Zheng and L. M. Ni, "Empower: A network emulator for wireline and wireless networks," in *Proc. of IEEE INFOCOM '03*, San Francisco, Calif., 2003, and J. Zhou, Z. Ji, and R. Bagrodia, "TWINE: A Hybrid Emulation Testbed for Wireless Networks and Applications," in *Proc. of IEEE INFO-COM '06*, Barcelona, Spain, 2006 provide examples of network emulation designs. A high level of abstraction in full network emulation approaches typically restricts their use with network-aware applications.

Hybrid network simulation: These types of approaches split the network protocol stack simulation onto two different machines and provide a mechanism that creates a virtual network that behaves identically to a real network from the perspective of real applications. A good example is J. Zhou, Z. Ji, M. Takai, and R. Bagrodia, "MAYA: Integrating hybrid network modeling to the physical world," *ACM Transactions on Modeling and Computer Simulation*, vol. 14(2), 2004.

More recently, significant work has been done on complete testbed technologies that allow a user to combine generic network emulation/hybrid simulation with real OS and application code, most notably in Emulab Team, "Emulab: total network testbed," Flux Group, School of Computing, University of Utah, 2009. [Online] available at: http://www.emulab.net and Network and Communication Systems Branch, "MANE publications," Naval Research Laboratory, 2008. [Online]. Available: http://cs.itd.nrl.navy.mil/pubs/. Neither includes support for network-aware applications. Limited support for setting parameters of the lower layers of a split stack is provided in T. Braun, T. Staub, and R. Gantenbein, "VirtualMesh: An Emulation Framework for Wireless Mesh Networks in OMNeT++," in *Proc. of OMNeT++2009* (*SIMU-Tools* 2009), 2009; however, their approach is lazy (depends on data sent), insufficiently general (addresses only writing parameter values), has high overhead (piggybacks on every data packet), and does not automate instrumentation of arbitrary simulation models.

Several existing mature and evolving network emulation tools include some level of support for software-in-the-loop or system-in-the-loop emulation, particularly ns-2 Team, "The Network Simulator—ns-2," 2009. [Online]. Available at: http://www.isi.edu/nsnam/ns/ and ns-3 Team, "The ns-3 network simulator," 2009. [Online]. Available at: http://www.nsnam.org/

Typically, the transparent IP packet forwarding functionality is exposed via an Ethernet-like network interface, and the user is expected to set up routing into the emulated network. Similarly to the complete testbeds mentioned above, emulation is restricted to real time, and no user-friendly facility is provided for applications to interact with the part of the node network stack implemented in the emulation. Scalable Network Technologies, "EXata," 2009. [Online]. Available: http://www.scalable-networks.com/products/exata.php provides simulated SNMP agents that execute in the simulator, as part of the lower-layer simulated stack. These SNMP agents are able to respond to a small subset of SNMP requests generated from outside of the simulation. Although this approach provides basic support for some applications, it cannot cope with applications that require full SNMP support, e.g., OpenNMS Team, "OpenNMS: Enterprise-grade Open-source Network Management," 2009. [Online]. Available: http://www.opennms.org/. Furthermore, execution of all the SNMP agents corresponding to all the nodes in a single centralized process (i.e. thesimulator) does not scale well, given that the computational and memory footprint of a full SNMP agent is non-negligible.

Note that all existing emulation tools do expose lower-level APIs for interacting with the emulated stack components, and the current VAN testbed functionality is built on top of such APIs for OPNET. However, the low-level APIs are very specific to a tool, require a considerable effort to learn and configure for the required fidelity, and do not, by themselves, provide a complete bridge between an unmodified network-aware application and the emulated stacks useful to a tester.

While this approach satisfies the testing and evaluation needs for applications that are agnostic of network activities and configurations, other applications, which are categorized as network-aware applications, need to interact with the network and/or respond to network configuration changes. Prominent examples of network-aware applications include:
i) network management applications that monitor network resources and/or configure network settings, and ii) communication middleware that adapts its communication strategies based on the observed network dynamics. Such applications are becoming more prevalent as MANET applications need to change their behavior according to the state of the network.

As a result, to enable the execution of network-aware applications over virtual networks, there is a need to allow applications to interact with the simulation/emulation at runtime in order to retrieve information from, and change configuration settings of, the virtual networks. Furthermore, virtual networks should expose these monitoring and control capabilities via a standard-based interface so that applications under test can run over virtual networks as they do over real networks, without any code modification. Traditionally, testbeds based on virtual networks do not support testing and evaluation of network-aware applications; existing testbeds that provide some form of interaction with the virtual network are limited by some of the following: approach generality, approach fidelity, and requirements on customizing applications under test.

Current solutions do not generate an external module agent for managing the local stack parameters implemented in the simulation/emulation. Such generic agent offers full functionality for accessing the emulated stack and thus can be used for any model and parameter.

SUMMARY OF THE INVENTION

The present invention concerns testbed technologies supporting the testing of network-aware applications over modeled networks, either simulated or emulated. The system described in conjunction this invention has been implemented on the Virtual Ad hoc Network (VAN) testbed, described in P. K. Biswas, C. Serban, A. Poylisher, J. Lee, S. Mau, R. Chadha, and C. J. Chiang, "An Integrated testbed for Virtual Ad Hoc Networks," in TRIDENTCOM 2009, Washington D.C., USA, 2009.

In order to provide standard expected interfaces for monitoring and controlling the simulated nodes in the virtual network, VAN testbeds provide SNMP for read and write access to the simulated node parameters of the virtual network. An architecture for linking a given simulation model to an SNMP agent has also been implemented to enable the construction of testbeds for functional testing and performance evaluation of distributed applications over many types of virtual MANETs.

One of the most salient features of a VAN testbed is its capability to allow testing of unmodified applications running under their native operating systems. This feature is supported by hosting applications on virtual machines (VMs) and using the transparent packet forwarding technology to direct packets to traverse a simulated network.

In order to provide standard expected interfaces for monitoring and controlling the simulated nodes in the virtual network, VAN testbeds currently support a subset of SNMP for read and write access to the simulated node parameters of the virtual network. An architecture for linking a given simulation model to an SNMP agent has also been researched and implemented.

In addition to supporting unmodified network-aware applications, VAN testbeds also provide a centralized standard management interface to access parameters of the emulated network for the purpose of monitoring and steering this network at run time, enabling highly realistic and controllable test scenarios.

The invention provides a general architecture of and functionality provided by a VAN testbed and technologies that enable management of the emulated network via SNMP and automated generation of interface code.

The invention concerns an important class of network-aware applications, of which network management systems are a primary example, that interact with several layers of the network stack in every network node. To support large-scale testing and evaluation of unmodified network-aware applications, VAN testbed technology is enhanced with the capability of instrumenting the underlying network model parameters for management access via standard management interfaces (preferably SNMP, but not limited to SNMP).

The invention also concerns a detailed design of the lower stack management mechanism, wherein the unmodified network-aware application uses a special SNMP agent module, SimSNMP to read and write lower stack parameters while the module marshals and forwards corresponding requests/results to/from the instrumentation in the simulation models.

Further, the invention concerns a set of tools that automatically generate both SimSNMP modules and the model instrumentation prototypes from a single MIB specification. The automated process obviates the need for SNMP server-side knowledge by the developers and significantly shortens development cycles.

Additionally, the invention concerns a similar instrumentation approach for local and global simulation model control via a Wizard MIB that allows introduction of changes (e.g., faults) into a running simulation via a standard management interface (again, SNMP); the Wizard MIB module and model instrumentation prototypes are also generated automatically.

The invention will be better understood when the following description is read in conjunction with the accompanying drawings.

BRIEF DESCRIPTION OF THE DRAWINGS

FIG. 1 is a representation of a network stack split into two parts.

FIG. 2, is a representation of an architecture of the VAN testbed and transparent forwarding.

DETAILED DESCRIPTION

Figure 3:
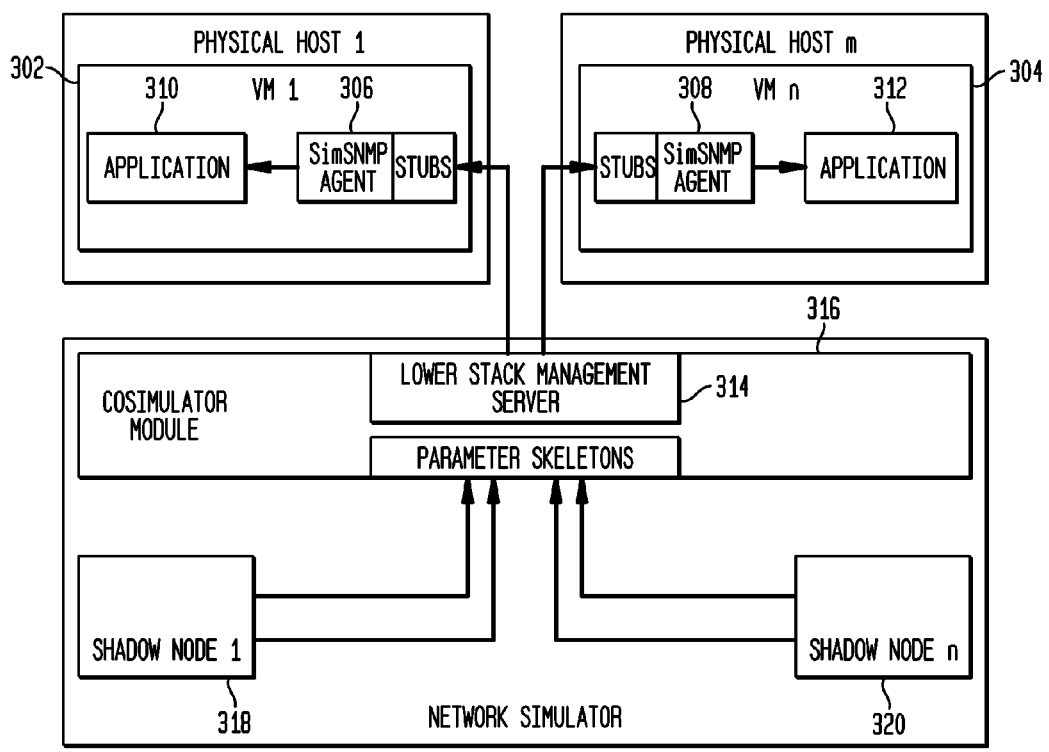
FIG. 3 is a schematic diagram of the interaction between an application and the simulated network.

The Virtual Ad hoc Network (VAN) Testbed technology is designed to allow the testing and evaluation of applications over MANETs. A VAN testbed places emphasis on: a) support for executing unmodified applications, i.e., without requiring code change to accommodate the testbed; b) fidelity-providing an accurate representation of the network that is virtualized; and c) scalability of the testbed—enabling a large number of copies of the same application to execute over the testbed.

In order to provide support for testing unmodified applications, a VAN testbed provides an environment that is as close as possible to the real deployment environment. Accordingly, each application instance executes over its own OS instance, thus having its own set of environment variables, libraries, configurations, and file systems.

In order to provide fidelity, the VAN testbed features an emulated network consisting of a network simulator that executes in real-time. The network simulator employs a software-in-the-loop technique to convert the packets generated by the applications into simulated packets to pass through the simulated network. The use of a simulated network provides several advantages over a more abstract network emulator. First, simulators traditionally offer higher fidelity by simulating the detail of packet forwarding process as packets travel through the protocol stacks and from one node to another. Second, major network simulators usually see a multitude of simulation models been built for prior simulation studies, thus allowing a testbed to utilize various models and scenarios, with the desired degree of fidelity. Third, when simulating a network, a simulator employs network scenarios containing a collection of simulated nodes interacting with each other, where each simulated node implements functionality corresponding to a real ad hoc node. The existence of simulated nodes provides an opportunity to the network-aware applications to exercise monitoring and control functions on the nodes consisting of the emulated networks.

In order to allow unmodified applications to exchange packets over a simulated network, the VAN testbed introduces the concept of a split stack. In a split stack, as shown in FIG. 1, the network stack 100 is split into two parts, where the higher layers of the stack 102 are implemented by the operating system hosting applications, while the lower layers of the stack 104 are implemented in the network simulator. In one embodiment of the invention, the stack is split at the IP layer: the transport layer and packet encapsulation function of the IP layer are provided by the host OS, while the simulator implements the rest of the protocol stack. The IP layer present in the simulator consists only of IP Encapsulation and enables creation of simulated IP packets out of real packets. However, neither the split stack concept nor the implementation of the invention are limited to splitting at the IP layer it may also be split, for example, at the MAC layer.

This configuration sets up an architecture for forwarding application-generated IP packets between the upper stack and the lower stack, as well as for accessing lower stack parameters for network-aware applications.

While the split stack concept alone allows the execution of unmodified applications over a simulated network, the testing and evaluation of large scale applications would require a prohibitively expensive testbed employing a large number of corresponding physical hosts. In order to address this issue, the VAN testbed uses host virtualization, such that multiple VMs can execute on the limited hardware resource. This technique allows each instance of the application to execute in a separate and possibly distinct environment, as provided by a real host at deployment, to replicate the target network environment. The upper half of the split stack is thus implemented in the VMs, while the lower half of the stack is implemented in the network simulator.

FIG. 2 shows a general architecture 200 of the VAN testbed. VMs 202-208 are installed on different physical hosts 210, 212. The network simulator 214 employs a network scenario comprises shadow nodes 216-222, each implementing the lower layers of the stack in their corresponding VM. Packets generated by an application are transferred to the simulator via packet router and injected in the corresponding shadow node, and transformed into simulated packets. Subsequently the simulated packets are forwarded to their destination, according to the simulation scenario. Finally, the packets are transformed into real packets and transferred to the destination VM and its corresponding application. The testbed employs a Packet Router module 224, 226 present on each physical host and a Cosimulator Module 228 loaded within the same process as the network simulator. The Packet Router is responsible for transferring the IP packets between the VMs and the simulator process with a low overhead. The Cosimulator is responsible for, among others, the transformation between real packets and simulated packets, as well as the control of simulation speed and synchronization with real time. More detail on the general architecture of VAN testbeds can be found in Biswas et al, supra.

Currently, VAN testbeds offer support for OPNET Modeler models. The VAN testbed technologies have been designed to be model-neutral, i.e. support the execution of third-party models with little or no manual conditioning. In order to be executed in a VAN testbed, a model should implement the lower half of the split IP stack, including a mobile network layer responsible for end-to-end packet forwarding. The present embodiment has been evaluated with different TDMA/OFDMA network implementing mobile network and mobile link layers, using both unicast and broadcast traffic.

VAN testbeds use Xen-based host virtualization. Xen, described in P. Barham, B. Dragovic, K. Fraser, S. Hand, T. Harris, A. Ho, R. Neuge-bauer, I. Pratt, and A. Warfield, "Xen and the art of virtualization," in *Proc. of SOSP* '03, 2003, is an open-source paravirtualization method which provides an abstraction layer that allows a physical host to execute one or more VMs, effectively decoupling the OS and its applications from the underlying physical machine. Xen currently supports a wide range of OSs including Linux, Solaris, BSD variants, and Windows (unmodified), on several mainstream CPU architectures.

Unlike many applications that treat the network as an opaque medium of communication, network-aware application require specific information from the network; network-aware applications can interact with a network in multiple ways: in addition to communicating over the network, they can probe network status at various points, monitor and reconfigure net-work devices. Consequently, a testbed that supports network-aware applications should provide integrated capabilities for both communicating through an emulated network and obtaining or changing network state. These two capabilities are inextricably linked. E.g., adaptive middlewares in ad-hoc net-works can detect signal quality, errors, and congestion present at radio interfaces and consequently change transmission rates; as a result of this adaptation, the same observed parameters could change their value in the presence of modified load. Also, network management applications can detect congestion based on latency and drop rates reported at the communication endpoints, and consequently change queuing policies. As a result, the experienced latency and drop rates will change accordingly. A testbed based on an emulated network should model this interdependency as closely as possible.

In traditional networks, important network management activities usually occur only at a small subset of the nodes that compose the network. This is not the case, however for MANETs, where every node in the network engages in routing and forwarding activities. As a consequence, in such networks, management activities have to take place at every single node, in coordinated fashion. From an emulated testbed perspective, it follows that every network-aware application executing on such testbed should have access to corresponding parameters implemented in the emulated network. Following the split stack model shown in FIG. 1, the application, executing in a real environment should have access to parameters implemented in the lower, i.e. simulated, stack of the protocol. Such parameters are referred to as lower stack parameters.

One of the main objectives of the invention is to enable applications to execute over the VAN testbed as in a real environment, with no modifications. Accordingly, various network-aware applications should access and control the network through the same interfaces as provided in a real environment. In order to support such capability, the VAN testbed provides access to lower stack parameters using SNMP. SNMP had been selected since it represents the still de-facto standard for network management, and the majority of the network-aware applications executing on top of the testbed are network management applications. However, the technology used in the present invention for accessing lower stack parameters can be easily applied to other types of interaction.

The VAN testbed provides every application running on a VM with standard SNMP interfaces for accessing lower stack parameters implemented in the shadow node. FIG. 3 shows the corresponding interaction between an application and the simulated network, and the pertaining modules.

Every VM 302, 304 in a VAN testbed hosts a special SNMP agent, called SimSNMP agent 306, 308 that exposes standard interfaces for accessing available parameters. Every SNMP request to a lower stack parameter is transferred to the simulator process where it is handled and the results are returned to the SimSNMP agent and subsequently to the application 310, 312.

The SimSNMP agent is implemented using Net-SNMP, described in Net-SNMP Team, "Net-SNMP toolkit," 2009. [Online]. Available: http://www.net-snmp.org/, a widely used open source package available for most major operating systems. The communication between the SimSNMP agent and the simulation process is carried out through CORBA calls, facilitating automatic adaptation for different parameters available on different network models. The following is the sequence of steps for accessing a lower stack parameter:

Application issues an SNMP GET or SET request for a parameter x identified by its SNMP object identifier.

An SimSNMP agent receives the request and invokes a custom Agent Module responsible for serving the Management Information Base (MIB) containing x. A MIB is a module containing a collection of objects, or parameters, used to manage entities in a network. The custom Agent Module is a loadable agent module generated specifically for serving the lower stack parameters provided to the application.

The custom Agent Module performs a CORBA request getX or setX by calling a corresponding stub method; stub methods are automatically generated for all lower stack parameters provided in the MIB. The CORBA request contains a shadow node identifier convenient for the simulation model (e.g., node number or IP address). Additional parameters are also supplied, e.g., indices (if request refers to a table), and values for SET.

The CORBA request is received by the Lower Stack Management Servant object 314 which, as part of the Cosimulator Module 316, resides in the same address space with the simulator process.

The Lower Stack Management Servant calls a skeleton method getXimpI or setXimpI supplied by the network model, which implements read or write access to the parameter. These methods are responsible for identifying the shadow node 318, 320, the parameter (and its index, if needed) and contain the logic for reading/writing the parameter.

Once the request has been satisfied, the response and its corresponding value, are returned to the SimSNMP agent via CORBA and subsequently to the application.

The VAN testbed is designed to be as general as possible, supporting various network models. More precisely, the testbed should be model-neutral, i.e. support the execution of third-party network models with little or no manual conditioning. While the parameters provided to the applications, their data types, and actual access implementation are dependent on the actual network model, the infrastructure for providing SNMP access for unmodified network-applications executing in the VMs should be a highly automated process. Such automated process can thus minimizing the time and effort required to test and evaluate a new application over a new, possibly third party, network model.

The process of instrumenting a VAN testbed to support a new network-aware application and new network model for access to lower stack parameters is as follows.

On the application side, assume that the application developer is familiar with the basic SNMP concepts and a client-side SNMP library, and can, by herself or with the help of model developers, identify the relevant management variables and encode them in a valid experimental SNMP MIB definition in ASN.1 (or obtain a standard MIB definition that covers the relevant functionality). We do not assume any knowledge of agent-side SNMP development, and the tools we developed completely obviate the need for such expertise.

On the model side, assume that the model instrumentation developer is familiar with the simulator APIs to be able to identify, read and write the values of instrumented stack parameters. We do not assume any knowledge of the cosimulation mechanisms or CORBA.

Figure 4:
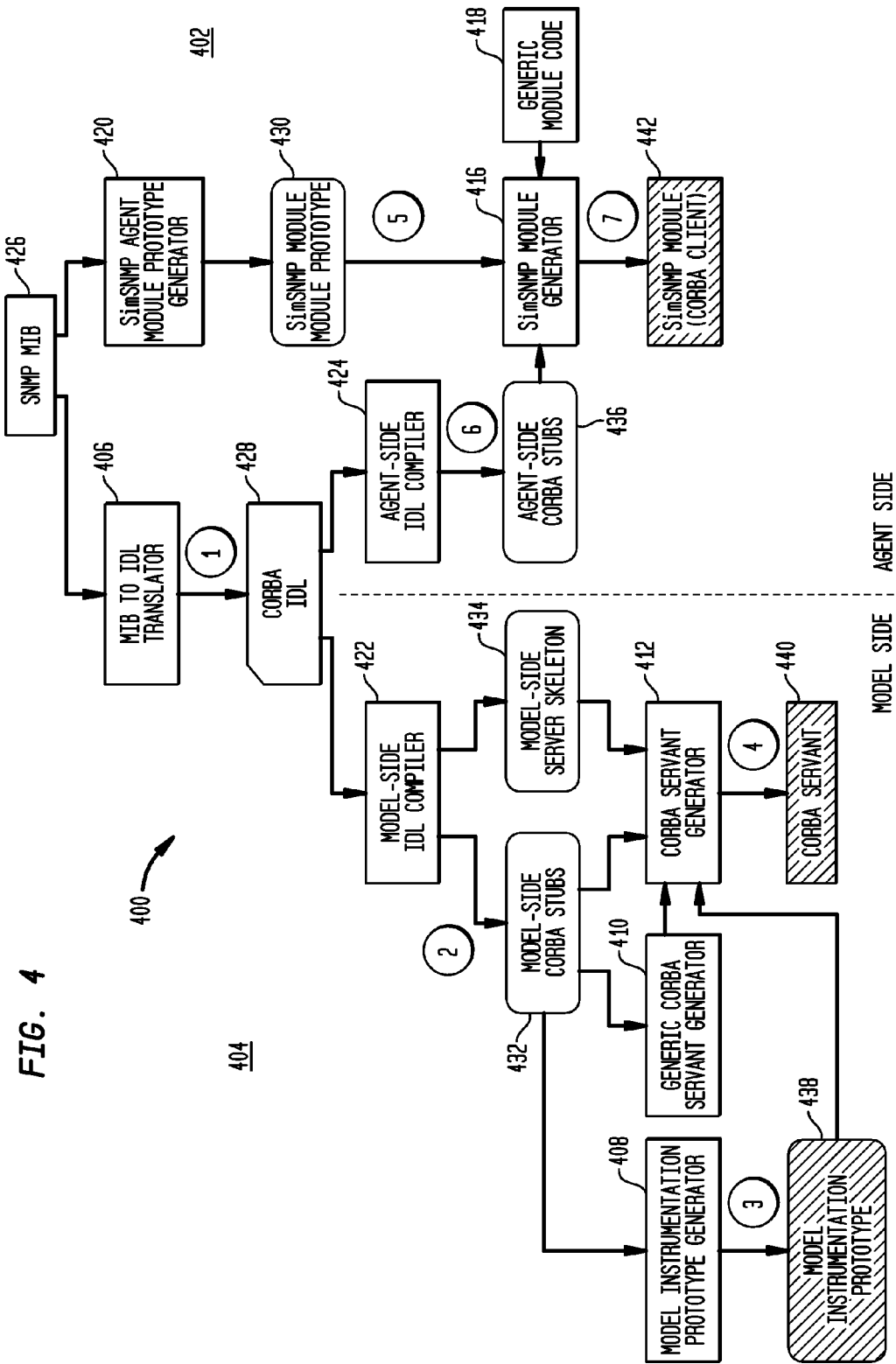
FIG. 4 is a flow chart of the generation of a SimSNMP agent module and model instrumentation prototype for use with the module.

Once a semantically acceptable and syntactically valid MIB definition is produced or obtained, the VAN testbed tools generate the model instrumentation prototypes and access mechanisms for SNMP as illustrated in FIG. 4. The process is naturally divided into two parts, agent side 402 and model side 404. In the FIG. 4, rectangles 406, 408, 412, 416 denote the tools provided the VAN testbed technologies, rectangles 420-424 identify third-party automation tools, icons 426, 428 denote specifications in standard notation (ASN.1 and CORBA Interface Definition Language (IDL)), boxes 430-436 indicate intermediate generation products, boxes 410, 418 show generic code supplied by the VAN testbed technologies and the box 438 denotes the model instrumentation prototype.

First, the MIB to IDL translator is executed on the MIB definition to generate an IDL interface specification (Step 1 in the FIG. 4). This step is common to both the agent side and the model side. The translator is implemented with I. Etingof, "Python SNMP framework," 2009. [Online]. Available: http://pysnmp.sourceforge.net and libsmi Team, "libsmi—A Library to Access SMI MIB Information," 2009. [Online]. Available: http://www.ibr.cs.tu-bs.de/projects/libsmi.

The IDL consists of a single module per MIB group and, for each variable x contains the definition of the corresponding getX and/or setX functions. The first argument to these functions is always the node identifier, other parameters include the value (for setX functions) and indices (for table entries). The IDL also includes some generic support functions, most notably functions to obtain information to initialize the Sim-SNMP agent module in general and SNMP tables in particular.

Next, on the model side, the IDL compiler of the object request broker (ORB) compatible with the simulator language is executed (e.g., omniORB in an implementation for OPNET) to produce the model-side stubs for the IDL functions and the model-side server skeleton (Step 2).

Continuing on the model side, the Model instrumentation prototype generator 408 is used to parse the model-side stubs and generate the corresponding model instrumentation function prototypes for each getX and setX function (Step 3). The generator also modifies the model build specification (e.g., a makefile) to compile and link in the generated prototype code.

Next, the CORBA servant generator 412 is used to combine a generic CORBA servant implementation (using CORBA Naming Service) with the generated stub 432 and skeleton definitions 438 to produce a CORBA servant 440 (Step 4). This involves source code generation, compilation and linking. At this point, the model instrumentation developers can start filling in the implementation of the model instrumentation functions.

The process on the agent side starts with the initial MIB definition, and the third-party SNMP agent module generation tool (e.g., mib2c from Net-SNMP) is used to produce a SimSNMP agent module prototype 430 (Step 5).

Next (Step 6), the IDL compiler 424 for an ORB compatible with the agent implementation tools (e.g., ORBit2 in an implementation with Net-SNMP) is used to generate the agent-side (client-side) CORBA stubs 436 from the IDL inter-face definition generated in Step 1.

Finally, the SimSNMP agent module generator 416 provided with the VAN testbed technologies is used to combine a generic CORBA client implementation 418 (using CORBA Naming Service), the agent-side CORBA stubs 436 and the Sim-SNMP agent prototype 430 to produce a complete Sim-SNMP agent module 442 operating as a CORBA client according to the IDL specification (Step 7). The generic client implementation includes initialization code for the Sim-SNMP module, most notably code to initialize SNMP agent module structures.

The model instrumentation developer can now use the familiar simulator API and programming language to implement the access functions for the generated prototypes. The implementation is then automatically linked with the model when the model is compiled.

Implementing access functions is model dependent and parameter dependent. In the simple case, such implementation can just access a global variable or function defined elsewhere in the simulation. In more complicated cases, when parameter-related information is based on event contexts, the implementation should employ asynchronous interactions with the model for generating events.

In addition to the MIBs required by the network-aware application executing on the testbed, the SimSNMP agent can also implement a so called Wizard MIB. This MIB can contain parameters required to steer the behavior of individual nodes and overall simulation for facilitating testing and debug activities. Examples of operations carried out through the Wizard MIB are the change of nodes coordinates, as well as the introduction of failures at various nodes at runtime. The parameters available through a Wizard MIB are only designed to be visible to the administrator or the operator of the testbed, and not to the application under testing. In general, Wizard MIB parameters could be: a) parameters not necessary to network-aware applications, b) parameters not reflected in the real network but a byproduct of modeling the network, or c) parameters used for injecting events (controlled errors, faults) in the simulated network. Wizard MIB parameters are implemented using the same mechanism described above.

In order to evaluate the scalability of the VAN testbed with respect to the management of lower stack parameters, we have measured the latency of the SNMP requests issued against a large number of SimSNMP agents. In this experiment, we launched between 40 and 1280 SimSNMP agents deployed in 10 Fedora Core (FC) 8 VMs running on 2 Dell Poweredge 1950 blades, under FCS Xen Dom0. The choice of 10 VMs/1280 agents was driven by available resources; latency values obtained in the setup indicate worse performance than that expected in the realistic single agent/VM case because of the overhead of context switching on a VM. The agents communicated with an instrumented OPNET model running on a separate Dell desktop. All physical machines were connected via a dedicated Gigabit Ethernet LAN. ORBit2 was used on the CORBA client, and OMNIOrb 4 on the CORBA server side.

For each SimSNMP agent we have launched a companion SNMP client that issued an SNMP GET request from the command line to the corresponding agent every second. The variables polled were 32-bit integers and octet strings of length 128, stored in scalars and tables, with the types split equally between 4 possible combinations. Each GET request contained a single SNMP varbind. In the simulation process, the values of the requested parameters were periodically computed and cached, independent of the polling.

Figure 5:
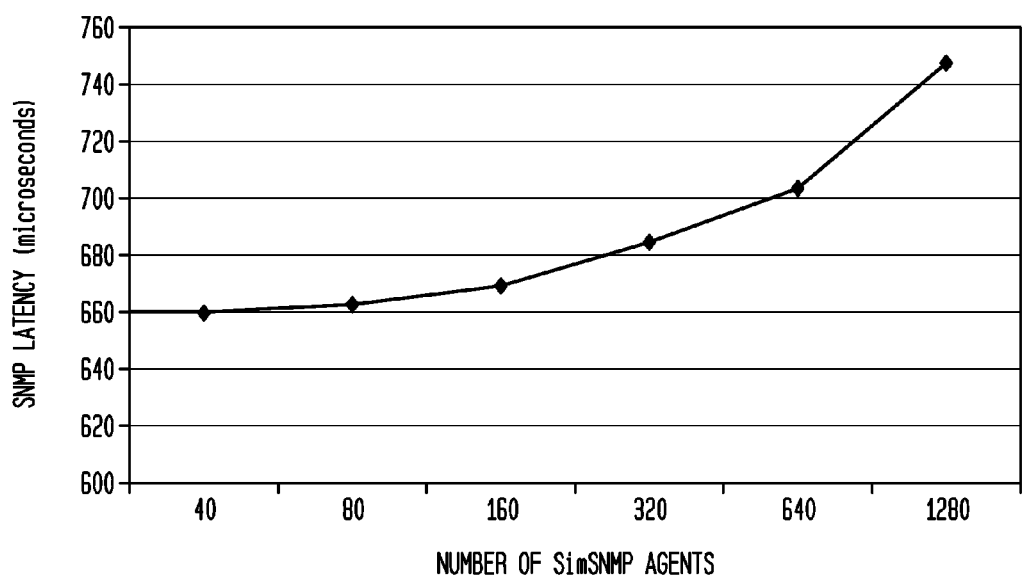
FIG. 5 is a graphical representation of measured latency of SimSNMP for scalability.

We measured the mean end-to-end latency of the SNMP requests at the SNMP client with time(1), over all requests and clients. The results are presented in FIG. 5. Note that the latency varies relatively little with the number of agents and remains small (747 µs per request) even with 1280 agents. The standard deviation varied between 990 µs (1280 agents) and 1100 µs (40 agents) for a data set size of more than 2 million samples, giving us a 95% confidence level at 5% accuracy.

Additionally, we measured the CORBA-specific component of the end-to-end latency, which remained fairly constant as the number of agents increased (392 µs per request with 40 agents, stdev of 623 µs cf. 360 µs per request with 1280 agents, stdev of 521 µs). Thus, CORBA latency represents about half of the overall latency for the 1280 agent case.

The bandwidth usage of the SNMP-induced traffic varied linearly between 80 Kbps (40 agents) and 2.4 Mbps (1280 agents). We have also observed that the CPU utilization of the simulation process was relatively constant, and independent of the number of issued SNMP requests, due to the low overhead of the access functions to cached parameters.

In order to empirically assess the usefulness and soundness of the VAN testbed for managing lower stack parameters, we evaluated a number of network management applications: DRAMA, IFC, MPT, and OpenNMS.

DRAMA (Dynamic Re-Addressing and Management for the Army) represents a policy-based MANET management system. DRAMA is composed of autonomous agents executing on, and managing each mobile node according to a set of policies. In order to evaluate DRAMA over a VAN testbed, we used a simulated MANET of 49 nodes. The testbed had been configured to execute on 7 physical machines, each hosting 7 VMs, all under FCS. Each VM has been configured to execute a DRAMA agent that periodically monitored several physical and link layer parameters (e.g., SNR, Slot Error Rate) provided by the SimSNMP agent.

IFC (Integrated Fault Correlator) represents a network management application designed to detect faults in the network and provide accurate diagnostics. We executed IFC on a 10 node scenario. Each node polled more than 20 parameters in the simulated stack every second (mostly interface traffic statistics, i.e., packet counts, discards, in/out errors, and queue occupancies). In addition, each IFC instance exchanged information with the other instances to assess end-to-end connectivity, and to exchange and correlate collected information. IFC testing demonstrated adequate testbed performance in the presence of medium-to-high traffic loads induced by VM-hosted applications. This evaluation also helped uncover shortcomings in the implementation when inter-IFC reporting of congestion was itself affected by congestion.

MPT (Mission To Policy Translator) represents a network management software designed to configure/reconfigure the network according to mission plans and take into account actual network conditions. We tested the MPT in a 10 node scenario, where MPT polled (link state) routing information from the mobile network layer, as well as radio interface status, both available from the lower layer of the split stack via a SimSNMP agent. In addition to monitoring, the MPT also assigned gateways and changed the administrative status of radio interfaces on active, passive, or disabled gateways for the purpose of increasing the reliability margins of the topology. These operations used SNMP SET via the SimSNMP agent, and the results of the reconfigurations were subsequently experienced by the MPT and other concurrently running applications.

OpenNMS is an enterprise grade network management system. We used it to collect more that 25 parameters on each node in a 10 node scenario. In this set of tests, a single OpenNMS instance was used to collect information from all the other nodes in the emulated network. Consequently, each SNMP GET request had been propagated through the emulated network, as in a real network; at the destination, the request was handled by the SimSNMP agent and the data was collected from the lower layers of the split stack, accurately modeling the OTA SNMP transfer and local data retrieval from the model. In addition to collecting information from the simulated stack, the same SimSNMP agent was used to collect VM-specific information, proving the ability of the agent to manage both upper and lower parts of the split stack.

Various aspects of the present disclosure may be embodied as a program, software, or computer instructions embodied in a computer or machine usable or readable device, which causes the computer or machine to perform the steps of the method when executed on the computer, processor, and/or machine.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as handheld, desktop, laptop, and/or server. A module may be a component of a device, software, program, or system that implements some "functionality", which can be embodied as software, hardware, firmware, electronic circuitry, or the like.

While there has been described and illustrated virtual ad hoc network testbeds for network-aware applications, it will be apparent to those skilled in the art that variations and modifications are possible without deviating from the broad scope and teachings of the present invention which shall be limited solely by the scope of the claims appended hereto.

What is claimed is:

1. A testbed that transforms a formal specification of a structured management information into a software system that allows retrieval and modification of management information from a running network model comprising:
   virtual machines installed on physical hosts;
   packet routers to transfer packets generated by an application running on a network to a simulator;
   shadow nodes for receiving transferred packets and further transferring the packets into simulated packets,
   management agents that communicate with network management tools by a standard network management protocol;
   software function prototypes for the management instrumentation of the network model; and means for connecting the management agents with the software function comprising virtual machines and a network simulator;

wherein the simulated packets are transformed into real packets and are transferred to a destination virtual machine and its corresponding application; and wherein the testbed includes a split stack comprising an upper half stack and a lower half stack and the upper half stack is implemented in the virtual machine and the lower half stack is implemented in the network simulator.

2. A testbed that transforms a formal specification of a structured fault inducing and monitoring information from a running network model using a standard network management protocol comprising:

a network interacting with a network-aware application over the network by having packet routers in the network to transfer s packets generated b the network-aware application to a network simulator and transferring the packets into simulated packets;

a fault management agent for communicating with fault management tools using a standard network management protocol;

software function prototype for the fault inducing and monitoring instrumentation of the network model;

means for connecting the management agent with the software function prototype, wherein the software function comprising virtual machines and the network stimulator;

wherein the simulated packets are transformed into real packets and are transferred to a destination virtual machine and its corresponding application; and wherein the testbed includes a split stack comprising an upper half stack and a lower half stack and the upper half stack is implemented in the virtual machine and the lower half stack is implemented in the network simulator;

whereby based on the interactivity over the network, network devices are reconfigured.

3. A method for transforming a formal specification of a structured management information into a software system that allows retrieval and modification of management information from a running network model by comprising:

interacting a network-aware application over a network by having packet routers in the network transfer packets generated by the network-aware application to a network simulator;

communicating between management agents and network management tools using a standard network management protocol and transferring the packets into simulated packets;

providing software function prototypes for management instrumentation of the network model;

connecting the management agents with the software function comprising virtual machines and the network simulator;

wherein the simulated packets are transformed into real packets and are transferred to a destination virtual machine and its corresponding application; and wherein the testbed includes a split stack comprising an upper half stack and a lower half stack and the upper half stack is implemented in the virtual machine and the lower half stack is implemented in the network simulator.

4. A computer readable device having computer readable program code for transforming a formal specification of a structured management information into a software system that allows retrieval and modification of management information from a running network model by comprising:

interacting a network-aware application over the network by having packet routers in the network transfer packets generated by the network-aware application to a network simulator and transferring the packets into simulated packets;

communicating between management agents and network management tools using a standard network management protocol;

providing software function prototypes for management instrumentation of the network model; and connecting the management agents with the software function comprising virtual machines and the network simulator;

wherein the simulated packets are transformed into real packets and are transferred to a destination virtual machine and its corresponding application; and wherein the testbed includes a split stack comprising an upper half stack and a lower half stack and the upper half stack is implemented in the virtual machine and the lower half stack is implemented in the network simulator.

5. The testbed as set forth in claim 1, further comprising accessing the lower half stack parameters for network-aware applications.

6. The testbed as set forth in claim 1, where a stack is split at the IP layer.

* * * * *

UNITED STATES PATENT AND TRADEMARK OFFICE
CERTIFICATE OF CORRECTION

PATENT NO. : 8,874,776 B2  
APPLICATION NO. : 13/042834  
DATED : October 28, 2014  
INVENTOR(S) : Serban et al.

Page 1 of 1

It is certified that error appears in the above-identified patent and that said Letters Patent is hereby corrected as shown below:

In the Specification

Column 2, Line 32, delete "Vandat," and insert -- Vahdat, --, therefor.

Column 3, Line 37, delete "thesimulator)" and insert -- the simulator) --, therefor.

Column 7, Line 25, delete "net-works" and insert -- networks --, therefor.

Column 8, Line 41, delete "getXimpI or setXimpI" and insert -- getXimpl or setXimpl --, therefor.

Column 10, Line 51, delete "FCS Xen DomO." and insert -- FC8 Xen Dom0. --, therefor.

Column 11, Line 36, delete "FCS." and insert -- FC8. --, therefor.

In the Claims

Column 13, Line 19, Claim 2, delete "transfer s packets generated b" and insert -- transfer packets generated by --, therefor.

Signed and Sealed this  
Thirtieth Day of June, 2015

Michelle K. Lee  
*Director of the United States Patent and Trademark Office*

UNITED STATES PATENT AND TRADEMARK OFFICE
CERTIFICATE OF CORRECTION

| | | |
|---|---|---|
| PATENT NO. | : 8,874,776 B2 | |
| APPLICATION NO. | : 13/042834 | |
| DATED | : October 28, 2014 | |
| INVENTOR(S) | : Serban et al. | |

It is certified that error appears in the above-identified patent and that said Letters Patent is hereby corrected as shown below:

In the specification

Column 1, Line 6 insert

-- GOVERNMENT LICENSE RIGHTS

This invention was made with government support under W15P7T-08-C-P213 awarded by United States Air Force. The government has certain rights in the invention. --

Signed and Sealed this
Sixth Day of September, 2016

Michelle K. Lee
*Director of the United States Patent and Trademark Office*